United States Patent [19]

Mighton

[11] 4,029,301
[45] June 14, 1977

[54] CONNECTIVE MEANS FOR PROVIDING VARIABLE ATTITUDE

[75] Inventor: Perceptimus J. Mighton, Tulsa, Okla.

[73] Assignee: H & M Pipe Beveling Machine Co., Tulsa, Okla.

[22] Filed: Sept. 7, 1976

[21] Appl. No.: 721,056

[52] U.S. Cl. .................................. 266/77; 148/9 R
[51] Int. Cl.² ........................................... B23K 7/10
[58] Field of Search ................ 266/56, 67, 71, 77; 33/21 C, 31; 148/9 R, 9 C, 9.6, 9.5; 269/71, 82–85; 82/4 C, 86

[56] References Cited
UNITED STATES PATENTS

| | | | |
|---|---|---|---|
| 1,415,547 | 5/1922 | Grieve | 33/31 |
| 1,565,824 | 12/1925 | Stevens et al. | 266/71 |
| 3,265,379 | 8/1966 | Mighton | 266/77 |

*Primary Examiner*—Gerald A. Dost

*Attorney, Agent, or Firm*—William S. Dorman

[57] ABSTRACT

A connective means which provides a variable attitude between a torch and a pipe beveling machine including a fixed plate with a flat surface attached to the pipe beveling machine. The plate is provided with two slots in the flat surface, a central slot and an outer slot. The longitudinal center line of the central slot is perpendicular to the longitudinal center line of the outer slot. The torch is seated in a saddle and a pin and bolt are each attached at one of their ends to the saddle. The pin and bolt are received into the central and outer slots, respectively, at right angles to the flat surface of the plate and are slideably movable longitudinally there along. A clamp means for placement on the bolt is provided to clamp the plate and saddle together with the saddle resting against the flat surface for maintaining a selected attitude during the operation of the pipe beveling machine.

8 Claims, 3 Drawing Figures

CONNECTIVE MEANS FOR PROVIDING VARIABLE ATTITUDE

BACKGROUND OF THE INVENTION

1. Field of the Invention

This invention relates to a connective means providing variable attitude between a torch and a pipe beveling machine. More particularly, this invention relates to a connective means having a plate attached to a pipe beveling machine with two slots which have their longitudinal center lines perpendicular, and a pin and bolt attached to a saddle supporting the torch which are received into the slots and are longitudinally movable along the slots.

2. Description of the Prior Art

Reference is made to the following U.S. Pat. Nos.: Hickey, 1,852,412, "Pipe Cutting Torch Support", Apr. 5, 1932; and Johnson, 3,856,282, "Pipe Cutting and Beveling Tool", Dec. 24, 1974. The Hickey patent shows and describes a means for providing a variable attitude between a pipe beveling machine and a torch which comprises an arcuate cutout in a plate attached to the machine. A square stud attached to a saddle containing the torch projects into the arcuate cutout. The attitude of the torch is varied by moving the stud along the arcuate cutout until the proper angle or attitude between the torch and the pipe beveling machine and therefore the pipe is attained. A clamp means is provided for maintaining the selected attitude.

The Johnson patent shows and describes an arrangement whereby the torch is attached through various extensions to the main body of the beveling machine by a single clamp which is movable along a slot. The clamp may also be loosened selectively to allow the torch to be pivotted for changing the attitude between the torch and the pipe beveling machine and, therefore, between the torch and the pipe.

Another connective means well known in the art is to provide a pivotal bearing between the torch support or saddle and the pipe beveling machine. An arcuate cutout on a plate attached to the machine is provided. A portion of the torch support projects into the arcuate cutout and a clamp means is provided to secure the torch and its saddle at the selected attitude.

In all of the prior constructions the torch and its saddle are pivotal about some pivot axis. They would be susceptible if a torque was applied to the torch or its support about that axis, although all of the constructions are clamped in some manner to the beveling machine or a plate mounted thereon, to movement about the pivot axis.

SUMMARY OF THE INVENTION

The present invention involves a connective means for providing a variable attitude between a torch and a pipe beveling machine. A plate is attached to the pipe beveling machine and is provided with two slots, a central slot and an outer slot, therein. The central slot has its longitudinal center line perpendicular to the longitudinal center line of the outer slot. The torch is seated in a saddle and is clamped thereto. A pin and bolt are provided and each is attached at one end to the saddle. The pin and bolt are placed into the central and outer slots, respectively, and are slideably movable longitudinally there along. The bolt is threaded and a clamp means is provided for placement thereon.

DETAILED DESCRIPTION OF THE PREFERRED EMBODIMENTS

Figure 1:
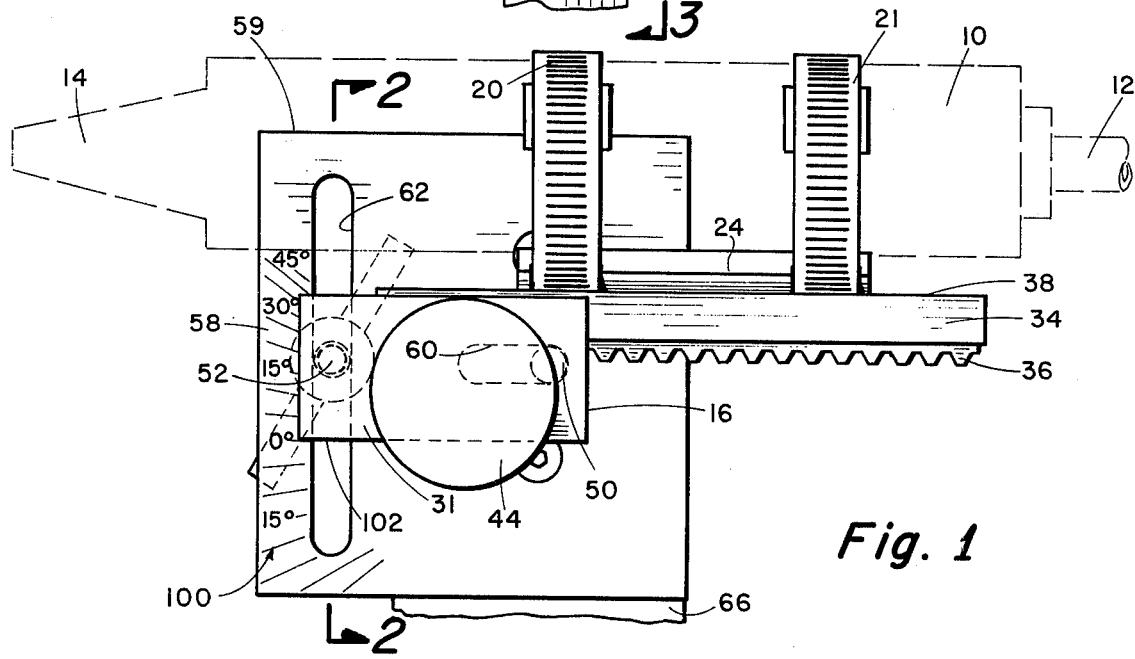
FIG. 1 is a front view of a connective means constructed according to the present invention.

FIG. 1 shows a typical torch 10 (shown in dotted lines). Gas is supplied to the torch through hose 12 (shown in dotted lines) and is directed by a nozzle 14 (shown in dotted lines) onto the material (not shown) such as a pipe which it is desired to cut. The torch 10 as shown in FIG. 1 can be attached to a saddle 16 by two band clamps 20 and 21 which pass through notches (not shown) in the bottom of seat 24 of saddle 16 for tightening torch 10 and seat 24 together.

Figure 2:
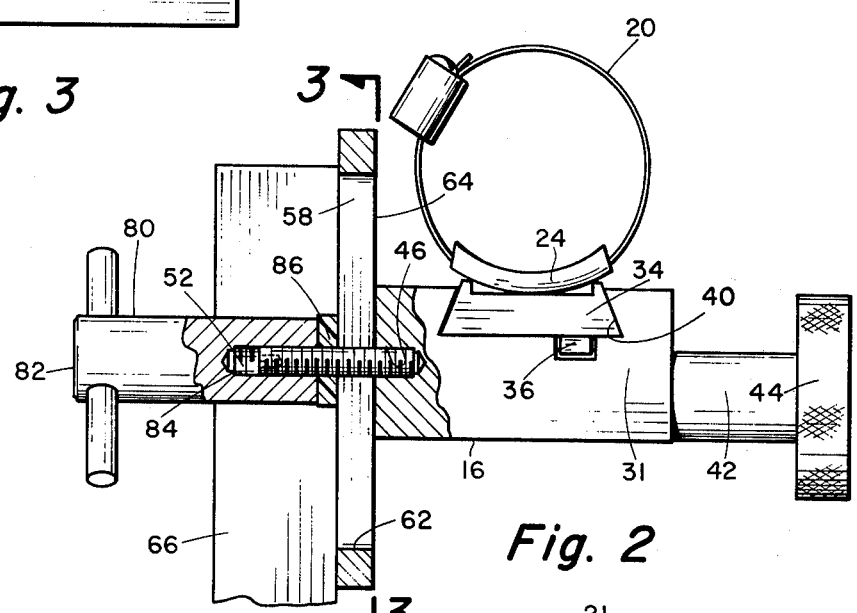
FIG. 2 is a side view of a connective means with a partial cross-sectional view taken along section line 2—2 of FIG. 1.

Seat 24 has an arcuate cross-section (as shown in FIG. 2) which is adapted to conform to the shape of torch 10. A bar 34, which has a serrated strip 36, is attached at its upper surface 38 to seat 24 by some standard method. Bar 34 has a basically trapezoidal cross-section (as shown in FIG. 2) which fits into a similarly shaped notch 40 in block 31. Block 31 is provided with a hole (not shown) for the purpose of accepting a portion (not shown) of shaft 42 therein. The portion of shaft 42 extending into block 31 is of smaller diameter than the external portion shown in FIG. 2. A sprocket (not shown) is attached to shaft 42 for engaging the serrated strip 36 of bar 34. A knob 44 is provided to facilitate the turning of shaft 42. When shaft 42 is rotated, the sprocket which is engaged with the serrated strip 36 will cause bar 34 to move. The movement of bar 34 will cause seat 24 and torch 10 to move with respect to block 31.

The saddle 16 is comprised of bands 20 and 21, seat 24, block 31, bar 34, shaft 42 and knob 44. Block 31 of saddle 16 is provided with two holes (only one of which, 46, is shown) into which a pin 50 and a bolt 52 are inserted and attached parallel to one another therein.

Figure 3:
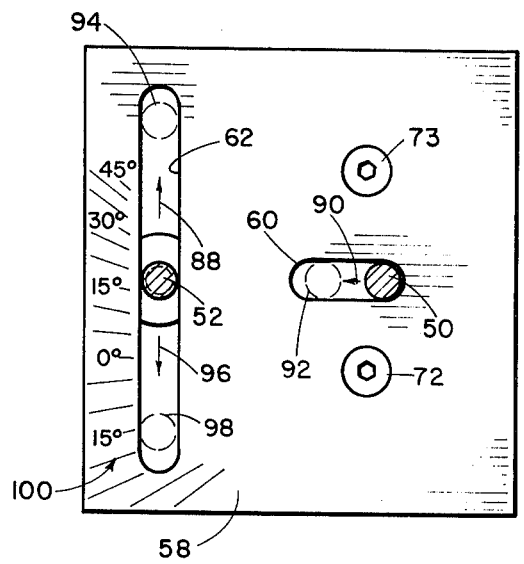
FIG. 3 is a cross-sectional view taken along section line 3—3 of FIG. 2.

A plate 58 of the connective means (generally designated as 59 in FIG. 1) is provided with a central slot (FIG. 3) and an outer slot 62 in a flat surface 64 (FIG. 2). Central slot 60, is located toward the center of plate 58 and is of a smaller longitudinal length as compared with outer slot 62. Outer slot 62 is located toward one edge of plate 58. As can be seen in FIG. 3, the longitudinal center line of the central slot 60 bisects the outer slot and is perpendicular to the longitudinal center line of the outer slot.

Plate 58 is attached to a portion 66 of a pipe beveling machine (not shown in detail) by some standard method, for example, by bolts 72 and 73 introduced into threaded holes in portion 66 provided for the purpose of tightening plate 58 and portion 66 together. Portion 66 might, for example, be a part of an out-of-round attachment as shown in the U.S. Patent for Mighton, U.S. Pat. No. 3,265,379, "Out-of-Round Attachment for Pipe Beveling Machine", Aug. 9, 1966. As shown in FIG. 1, portion 66 will extend along plate 58 to cover one side of central slot 60. Pin 50 is received into central slot 60 and bolt 52 is received into outer slot 62 at right angles to flat surface 64. The pin 50 and bolt 52 are of a slightly smaller diameter than the width of their respective slots. Pin 50 may be made of such a length that it only extends beyond block 31 a distance less than the depth of plate 58, or another slot (not shown) in portion 66 could be provided juxtaposed with central slot 60 for receiving the portion of pin 50 extending beyond plate 58.

Bolt 52 extends from block 31 through outer slot 62 in plate 58 and some distance beyond plate 58. A clamp 80 (FIG. 2) is provided for tightening saddle 16 and plate 58 together. The clamp 80 as shown in FIG. 2 has a cylinder 82 which is provided with a threaded hole 84. The bolt 52 is also threaded. Threaded hole 84 is of a suitable size so that cylinder 82 may be placed on bolt 52. A washer 86 is provided between cylinder 82 and plate 58 to prevent the clamp from loosening during the operation of the beveling machine. The connective means 59 is comprised of the plate 58, pin 50, bolt 52 and clamp 80.

In operation the clamp 80 is loosened to allow pin 50 and bolt 52 to be slideably moved along slots 60 and 62, respectively. The saddle 16 rests against and is movable on the flat surface 64 of plate 58. The pin 50 and the bolt 52 being affixed into block 31 of saddle 16 are maintained in fixed spacial relationship with respect to one another. Thus, the block 31 acts as a support for the maintanence of this fixed relationship between pin 50 and bolt 52.

As bolt 52 is moved upward (as shown in FIG. 3) in the direction of arrow 88, pin 50 will move along the central slot in the direction of arrow 90 which is to the left (as shown in FIG. 3). Pin 50 and bolt 52 may continue to be slid along their respective slots in the directions of arrows 90 and 88 until the extreme positions, designated 92 and 94, respectively, (shown approximately by dotted lines in FIG. 3), are attained. Bolt 52 may also be moved downward in the direction of the arrow 96 towards the extreme position 98 while pin 50 is slid along central slot 60. The pin 50 will be in the extreme position 92 when bolt 52 is in position 98 because of the fixed spacial relationship between pin 50 and bolt 52.

A scale 100 is provided to facilitate the setting of the proper attitude. The lower edge 102 of block 31 (as shown in FIG. 1) serves as the reference for the scale. It is, of course, possible to use other parts of the saddle 16 as reference markers. Once the proper attitude has been selected by moving the lower edge 102 to align it with the proper setting on scale 100, clamp 80 may then be tightened to maintain the selected attitude.

As shown in FIGS. 1 and 3, pin 50 and bolt 52 are of approximately the same diameter as the widths of their respective slots 60 and 62. When a torque is applied to the torch 10 or the saddle 16, the pin 50 and the bolt 52 tend to press against a side of their respective slots assisting the clamp 80 in resisting any change in the selected attitude. Thus, the selected attitude is maintained by more than merely the amount of frictional force which is provided by clamp 80. It is well known in the art that it is desirable to maintain a fixed attitude relationship between the torch, and the pipe beveling machine and thereby the pipe being cut so that the angled beveled edge of the pipe will be substantially similar around the entire circumference of the pipe (not shown).

Pin 50 and bolt 52 and their respective slots may be of various sizes and slots 60 and 62 may be of various lengths and proportional relationships. For example, a plate might be utilized with an outer slot which consisted of only the lower half of slot 62 as shown in FIG. 3. The torch saddle may be of any number of designs as long as a support of some type maintains a fixed spacial relationship between pin 50 and bolt 52. The connective means could be utilized between any number of tools and tool holders. The slots would not have to be cut into plate 58 so that the sides of the slots are parallel to the edges of the plate 58.

Whereas the present invention has been described in particular relation to the drawings attached hereto it should be understood that other and further modifications, apart from those shown or suggested herein, may be made within the spirit and scope of this invention.

I claim:

1. Connective means providing a variable attitude between a torch and a pipe beveling machine, comprising a movable saddle supporting said torch, a fixed plate attached to said pipe beveling machine and provided with a flat surface having a central slot therein, said central slot having a first longitudinal center line, an outer slot in said flat surface having a second longitudinal center line, said first center line being perpendicular to said second center line, a pin attached at one end to said saddle and having another end opposite to said one end thereof received in said central slot at a right angle to said flat surface, said pin being slideably movable longitudinally along said central slot, a bolt attached at one end to said saddle and having another end opposite to said one end thereof passing through said outer slot at a right angle to said flat surface, said bolt being slideably movable along said outer slot, said saddle resting against and movable on said flat surface for allowing the attitude of said torch with respect to said beveling machine to be varied.

2. Connective means providing variable attitude as set forth in claim 1, wherein said first center line bisects said outer slot.

3. Connective means providing variable attitude as set forth in claim 1 including a clamp means connected to said another end of said bolt for selectively clamping said saddle and said plate together for maintaining a selected attitude of said torch with respect to said beveling machine.

4. Connective means providing variable attitude as set forth in claim 3 wherein said bolt is threaded and said clamp means is provided with a threaded hole suitable for placement on said another end of said bolt.

5. Connective means providing variable attitude as set forth in claim 3 wherein said central slot has a lateral width of a given size, said outer slot has a width of a given size, and said pin and said bolt are of a slightly smaller diameter than the widths of their slots, respectively, and wherein said pin and said bolt engage the sides of said central slot and said outer slot assisting said clamp means to maintain the selected attitude of said torch.

6. Connective means for providing a variable attitude between a tool and a tool holder comprising a fixed plate attached to said tool holder and provided with a flat surface having a central slot therein, said central slot having a first longitudinal center line, an outer slot in said flat surface having a second longitudinal center line, said first center line bisecting said outer slot and being perpendicular to said second center line, a support means attached to said tool and resting against said flat surface, a pin having one end received within said central slot disposed at right angles to said flat surface, and attached at another end opposite to said one end thereof to said support means, a bolt having one end received within said outer slot, disposed at right angles to said flat surface, and attached at another end opposite to said one end thereof to said support means for maintaining a fixed spacial relationship between said pin and said bolt, said pin being at the end of said central slot opposite from said outer slot when said bolt is located at the longitudinal center of said outer slot, said pin and said bolt being slideably longitudinally movable within their respective slots for providing a variable attitude between said tool and said tool holder.

7. Connective means providing variable attitude as set forth in claim 6 including clamp means connected to said bolt for selectively clamping said support means and said plate together for maintaining a selected attitude.

8. Connective means providing variable attitude as set forth in claim 7 wherein said central slot has a lateral width of a given size, said outer slot has a width of a given size, and said pin and said bolt are of a slightly smaller diameter than the widths of their slots, respectively, and wherein said pin and said bolt engage the sides of said central slot and said outer slot assisting said clamp means to maintain the selected attitude.

* * * * *